United States Patent [19]

Gibson et al.

[11] Patent Number: 5,194,575
[45] Date of Patent: Mar. 16, 1993

[54] POLYAMIDE CONTAINING REISSERT UNIT(S)

[75] Inventors: Harry W. Gibson; Yajnanarayana H. R. Jois, both of Blacksburg, Va.

[73] Assignee: Virginia Tech Intellectual Properties, Inc., Blacksburg, Va.

[21] Appl. No.: 689,418

[22] Filed: Apr. 22, 1991

[51] Int. Cl.$^5$ .............................. C08G 69/36
[52] U.S. Cl. .................... 528/328; 525/420; 528/329.1
[58] Field of Search ............ 528/328, 329.1; 525/420

[56] References Cited

U.S. PATENT DOCUMENTS 4,929,713  5/1990  Gibson .................. 528/230

Primary Examiner—Harold D. Anderson
Attorney, Agent, or Firm—Richard P. Fennelly; Louis A. Morris

[57] ABSTRACT

Polyamide compositions containing Reissert units can be formed by the reaction of an open chain bis Reissert compound or a mono Reissert compound with a diamine and a diacid chloride.

6 Claims, No Drawings

POLYAMIDE CONTAINING REISSERT UNIT(S)

BACKGROUND OF THE INVENTION

Polyamides are an important and well known class of polymers used as fibers (textile and industrial) as well as in construction and are formed by the condensation polymerization of a diamine and a diacid chloride. Poly(hexamethylene adipamide) was the first synthetic fiber produced industrially on a large scale by Carothers with the trade name nylon-66 and it has the following structure.

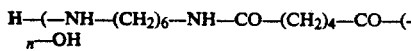

Nylon-66 is one of the important polyamides with an excellent fiber and thermoplastic properties. For example, nylon-66 is silk like and has displaced both natural silk and cotton from the market. In addition, it can be readily dyed or pigmented and has good texturizing properties. The dyeability can be varied within wide limits by copolymerization with monomers containing acidic or basic groups, by end group variation, or by grafting. Such applications in various areas other than the textile industry has also been very well documented in literature. Polyamides containing aliphatic cyclic structures in the polymer chain are somewhat superior to the acyclic polyamides in terms of thermal stability, whereas aromatic polyamides have greatly improved thermal stability compared to aliphatic polyamides. However, most of these polyamides are soluble only in $H_2SO_4$, formic acid and m-cresol. Thus, the net range of studies of these polymers in solution is limited.

An object of the present invention is to utilize open chain Reissert chemistry to improve the properties of polyamides. U.S. Pat. No. 4,929,713 reports the synthesis of open chain poly(Reissert compounds) by the aromatic dialdehyde and primary amine, in the presence of cyanide and bisulfite, followed by reaction of the product with an aliphatic diacid chloride. It does not suggest use of Reissert chemistry for the modification of polyamides.

SUMMARY OF THE INVENTION

The present invention relates to the modification of polyamides (e.g., nylon 6,6) by the incorporation of one or more open chain Reissert units therein. The incorporation can be by manner of end capping the polyamide, for formation of a block copolymer comprising nylon and Reissert units, or by the formation of a random copolymer containing such units.

Copolymers, either random or block copolymers, containing polyamide and Reissert units can be synthesized by reaction of the type of α-aminonitrile described in U.S. Pat. No. 4,929,713 which has the structure

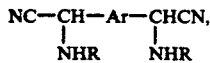

where R is alkyl, e.g., lower alkyl, with a diacid chloride and a diamine. The diacid chloride can have the general formula $ClC(O)R^1C(O)Cl$, where $R^1$ can be alkylene, e.g., $C_4$ alkylene, and the diamine can be of the formula $H_2NR^2NH_2$, where $R^2$ can also be alkylene, such as $C_6$ alkylene. The reaction conditions used can be the type of reaction conditions analogously used to form conventional polyamide compositions (e.g., a chlorinated hydrocarbon solvent and an amine acid acceptor, such as triethylamine). Random copolymer formation is favored when the diacid chloride is added to the α-aminonitrile followed by the addition of the diamine. The reaction favors block copolymer formation when the diacid chloride is added to the mixture of α-aminonitrile and diamine.

The polymers that are formed in accordance with the present invention comprise units containing the Reissert structure (R and $R^1$ being as defined above):

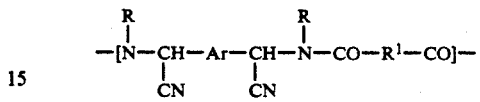

and units containing polyamide units ($R^1$ and $R^2$ as defined above):

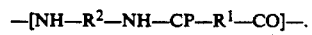

If end capped polyamide oligomers are desired with the end capping being a Reissert unit, a monofunctional aminonitrile can be utilized. This monofunctional aminonitrile is of the general structure

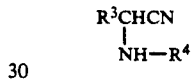

where $R^3$ is alkyl, for example, ethyl, and $R^4$ can also be alkyl, for example methyl.

End capped oligomers or polymers will have the following general structure, for example ($R^1$ to $R^4$ being as earlier defined).

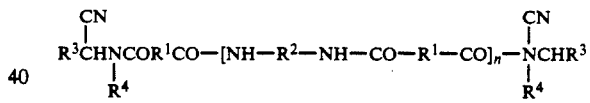

The foregoing invention is further illustrated by the Examples which follow.

EXAMPLE 1

Synthesis of Nylon-6,6 (Reference: Practical Macromolecular Organic Chemistry, K. J. Ivin, ed., Harwood Academic Publishers, New York, 1984, p 258):

To a mechanically stirring solution of 1,6-hexanediamine (49.9 mmole, 5.7982 gm, weighed under $N_2$ atm), and triethylamine (110 mmole, 15.3 mL) in $CHCl_3$ (100 mL, dry, alcohol free) was added adipoyl chloride (49.9 mmole, 9.1321 gm in $CHCl_3$ (20 mL) under dry conditions in less than thirty seconds. This reaction was very exothermic and needed double condensers cooled by ice-water circulation. However, the reaction mixture was not cooled to suppress the reaction rate. The reaction mixture was left stirring overnight, and then excess $CHCl_3$ and triethylamine were removed by rotary evaporation. The residue was poured into water (1L) and stirred at room temperature for five hours. The white solid obtained by filtration was treated with 1M HCl, filtered, washed with excess of water, and dried (1 mm/45° C., overnight), 7.52 gm (67%). $[\eta]=0.51$ dL/gm (25° C., m-cresol). TGA: 10% wt loss (air)=380° C. DSC: $T_g=61°$ C., $T_m=251°$ C. $^1$H NMR ($CF_3COOD+TMS$): δ11.69 (s, $CF_3COOH+NH+$-

$H_2O$), 3.59 (s, 2×N—$CH_2$), 2.81 (s, 2×$COCH_2$), 1.95, 1.77, 1.50 (singlets, N—C—$(CH_2)_4$—C—N CO—C—$(C_2)_2$—C—CO).

EXAMPLE 2

Triblock Copolymer:

To a mechanically stirring solution of 1,6-hexanediamine (31.387 mmole, 3.6475 gm, weighed under $N_2$ atm), α,α'-dicyano-α,α'-bis(N-methylamino)-p-xylene (17.895 mmole, 3.8344 gm), and triethylamine (110 mmole, 15.3 mL) in $CHCl_3$ (100 mL, dry, alcohol free) was added adipoyl chloride (49.282 mmole, 9.02 gm in $CHCl_3$ (50 mL), under dry conditions in less than thirty seconds. This reaction is very exothermic and needed double condensers cooled by ice-water circulation. However, the reaction mixture was not cooled to suppress the reaction rate. The reaction mixture was left stirring overnight, and then excess $CHCl_3$ and triethylamine were removed by rotary evaporation. The residue was poured into water (1L) and stirred at room temperature for five hours. The white solid obtained by filtration was treated with 1M HCl, filtered, washed with excess of water, and dried (1 mm/45° C., overnight), 5.57 gm (67.8%). $[\eta]=0.50$ dL/gm (25° C., m-cresol). TGA: 10% wt. loss (air)=370° C. DSC: $T_g=70°$ C., $T_m-251°$ C. $^1H$ NMR ($CF_3COOD$+TMS): Integration calculations for aromatic and acidic protons to aliphatic protons revealed that the polymer contained 32% Reissert units and 68% nylon-66 units. $^1H$ NMR (DMSO - $d_6$): Integration calculations for aromatic and acidic protons to aliphatic protons revealed that polymer contained 37% Reissert units and 63% nylon - 6,6 units. This polymer was soluble in DMSO.

EXAMPLE 3

Triblock Copolymer:

To a mechanically stirring solution of 1,6-hexanediamine (44.725 mmole, 5.1975 gm, weighed under $N_2$ atm), α,α'-dicyano-α,α'-bis(N-methylamino)-p-xylene (4.994 mmole, 1.0701 gm), and triethylamine (110 mmole, 15.3 mL) in $CHCl_3$ (100 mL, dry, alcohol free), was added adipoyl chloride (49.719 mmole, 9.1000 gm in $CHCl_3$ (20 mL) under dry conditions in less than fifteen seconds. This reaction was very exothermic and needed double condensers cooled by ice-water circulation. However, the reaction mixture was not cooled to suppress the reaction rate. The reaction mixture was left stirring overnight, and then excess $CHCl_3$ and triethylamine were removed by rotary evaporation. The residue was poured into water (1L) and stirred at room temperature for five hours. The white solid obtained by filtration was treated with 1M HCl, filtered, washed with excess of water, and dried (1 mm/45° C., overnight), 5.29 gm (50%), $[\eta]=0.55$ dL/gm (25° C., m-cresol). TGA: 10% wt loss (air)=340° C. DSC: $T_g=61°$ C., $T_m=250°$ C. 1H NMR ($CH_3COOD$ +TMS): Integration calculations for aromatic and acidic protons to aliphatic protons revealed that the polymer contained 12% Reissert units and 88% nylon-6,6 units.

EXAMPLE 4

Open chain poly(Reissert compound):

U.S. Pat. No. 4,929,713 in Examples 1-2 illustrate synthesis of this composition.

EXAMPLE 5

Nylon 6,6 end capped with Reissert compound:

To a mechanically stirring solution of 1,6-hexanediamine (46.92 mmole, 5.4524 gm, weighed under $N_2$ atm), and 1-cyano-1-(N-methylamino)propane (1.902 mmole, 0.1870 gm), triethylamine (110 mmole, 15.3 mL) in $CHCl_3$ (100 mL, dry, alcohol free), was added adipoyl chloride (47.87 mmole, 8.7616 gm in $CHCl_3$ (20 mL) was added under dry conditions in less than twenty seconds. This reaction was very exothermic and needed double condensers cooled by ice-water circulation. However, the reaction mixture was not cooled to suppress the reaction rate. The reaction mixture was left stirring overnight, and then excess $CHCl_3$ and triethylamine were removed by rotary evaporation. The residue was poured into water (1L) and stirred at room temperature for five hours. The white solid obtained by filtration was treated with 1M HCl (1L), water (excess), methanol (1L), methanol (1L) filtered, and dried (1 mm/45° C., overnight), 7.02 gm (68%), $[\eta]=0.57$ dL/gm (25° C., m-cresol). TGA: 10% wt loss (air)=320° C. DSC: $T_g=59°$ C., $T_m=248°$ C. $^1H$ NMR ($CH_3COOD$+TMS): Integration calculations for acidic protons to aliphatic protons revealed that the polymer contained 3.5% Reissert units and 96.5% nylon-6,6 units.

EXAMPLE 6

Nylon 6,6 end capped with Reissert compound:

To a mechanically stirring solution of 1,6-hexanediamine (45.13 mmole, 5.2440 gm, weighed under $N_2$ atm), and 1-cyano-1-(N-methylamino)propane (0.9025 mmole, 0.0886 gm), triethylamine (110 mmole, 15.3 mL) in $CHCl_3$ (100 mL, dry, alcohol free), was added adipoyl chloride (45.58 mmole, 8.3427 gm) in $CHCl_3$ (50 mL) under dry conditions in less than twenty seconds. This reaction was very exothermic and needed double condensers cooled by ice-water circulation. However, the reaction mixture was not cooled to suppress the reaction rate. The reaction mixture was left stirring overnight, and then excess $CHCl_3$ and triethylamine were removed by rotary evaporation. The residue was poured into water (1L) and stirred at room temperature for five hours. The white solid obtained by filtration was consecutively treated with 1M HCl (1L), water (excess), methanol (1L), methanol (1L), filtered, and dried (1 mm/45° C., overnight), 6.6 gm (63.5%), $[\eta]=0.53$ dL/gm (25° C., m-cresol). TGA: 10% wt loss (air)=360° C. DSC: $T_g=58.5°$ C., $T_m=217°$, 249° C. $^1H$ NMR ($CF_3COOD$+TMS): Integration calculations for acidic protons to aliphatic protons revealed that the polymer contained 3.5% Reissert units and 96.5% nylon-6,6 units.

EXAMPLE 7

Nylon 6,6 end capped with Reissert compound:

To a mechanically stirring solution of 1,6-hexanediamine (53.42 mmole, 6.2079 gm, Weighed under $N_2$ atm), 1-cyano-1-(N-methylamino)propane (18.8782 mmole, 1.8529 gm), triethylamine (110 mmole, 16 mL) in DMF (75 mL, dry), adipoyl chloride (62.8591 mmole, 11.5051 gm) in DMF (25 mL) was added under dry conditions in less than twenty seconds. This reaction mixture was left stirring overnight, and then poured into excess water (4L) and stirred at room temperature for five hours. The white solid obtained by filtration was consecutively treated with 1M HCl (1L), water, methanol (1L), methanol (1L), filtered, and dried (1 mm/45° C., overnight), 6.9 gm. $[\eta]=0.21$ dL/gm (25° C., m-cresol). TGA: 10% wt loss (air)=375° C. DSC: $T_g=88°$ C., $T_m$=226°, 235° C. $^1$H NMR (CF$_3$COOD+TMS): Integration calculations for acidic protons to aliphatic protons revealed that the polymer contained 6% Reissert units and 94% nylon-6,6 units.

EXAMPLE 8

Nylon 6,6 end capped with Reissert compound:

To a mechanically stirring solution of triethylamine (110 mmole, 16 mL) in dimethylformamide (25 mL) the following two solutions were added dropwise simultaneously over a fifteen minute period at 5°-10° C.: (a) adipoyl chloride (50.0 mmole, 9.1520 gm) in dimethylformamide (25 mL): and (b) 1,6-hexanediamine (50.0 mmole, 5.80 gm), and 1-cyano-1-(N-methylamino)propane (100 mmole, 9.815 gm) in dimethylformamide (25 mL). The reaction mixture was stirred for two days at room temperature and then poured into water (3L). The white solid obtained by filtration was washed with excess water and methanol and was dried (1 mm/45° C., overnight), 2.70 gm. [$n$]=0.13 dL/gm (25° C., m-cresol). TGA: 10% wt loss (air)=370° C. DSC: $T_m$=147°, 178° C. $^1$H NMR (CF$_3$COOD+TMS): Integration calculations for acidic protons to aliphatic protons revealed that the polymer contained 22% Reissert units and 78% nylon-6,6 units. The filtrate was extracted with EtOAc (3×300 mL). The organic layer was consecutively washed with 8% HCl (3×300 mL), saturated NaHCO$_3$ (3×300 mL), water (3×300 mL), dried over Na$_2$SO$_4$ and dried (1 mm/35° C.), 3.8 gm. IR (neat) and $^1$H NMR (CDCl$_3$) were identical with those of adipoyl bis[N-1-cyanopropyl-N-methylamide].

EXAMPLE 9

Random copolymer:

To a mechanically stirring solution of α,α'-dicyano-α,α'-bis(N-methylamino)-p-xylene (17.895 mmole, 3.8344 gm) and triethylamine (120 mmole, 18 mL) in CHCl$_3$ (100 mL, dry), was added adipoyl chloride (52.2865 mmole, 9.57 gm) in CHCl$_3$ (50 mL) under dry conditions in a two minute period at 5°-10° C. This yellowish solution was stirred for fifteen minutes and then 1,6-hexanediamine (34.392 mmole, 3.9967 gm) in CHCl$_3$ was added. The reaction mixture was left stirring overnight, and then excess CHCl$_3$ and triethylamine were removed by rotary evaporation. The residue was poured into water (1L) and was stirred at room temperature for five hours. The white solid obtained by filtration was consecutively treated with aqueous HCl (1L, pH of about 2), water:methanol (1:1), filtered, and dried (1 mm/45° C., overnight), 7.0 gm. [$n$]=0.16 dL/gm (25° C., m-cresol). TGA: 10% wt loss (air)=260° C. DSC: $T_g$=99° C. IR (KBr): 3658-3070 (broad, NH), 2935, 2863 (C—H), 2243 (CN), 1713, 1654 (N—C)), 1648, 1598, 1541, 1514, 1472, 1465, 1457, 1451 and 1417 cm$^{-1}$. $^1$H NMR (CF$_3$COOD+TMS): Integration calculations for aromatic and acidic protons to aliphatic protons revealed that the polymer contained 43% Reissert units and 57% nylon-6,6 units.

EXAMPLE 10

Random copolymer:

To a mechanically stirring solution of α,α, '-dicyano-α-α'-bis(N-methylamino)-p-xylene (17.895 mmole, 3.8344 gm) and triethylamine (120 mmole, 20 mL) in CHCl$_3$ (50 mL, dry), was added adipoyl chloride (52.2865 mmole, 9.57 gm) in CHCl$_3$ (20 mL) under dry conditions in a two minute period at 5°-10° C. This yellowish solution was stirred for fifteen minutes and then 1,6-hexanediamine (34.392 mmole, 3.9967 gm) in CHCl$_3$ (50 mL) was added. The reaction mixture was left stirring overnight, and then excess CHCl$_3$ and triethylamine were removed by rotary evaporation. The residue was poured into water (1L) and was stirred at room temperature for five hours. The white solid obtained by filtration was consecutively treated with aqueous HCl (1L, pH of about 3), water:acetone (1:1, 1L), water (1L), filtered, and dried (1 mm/45° C., overnight), 6.0 gm. [$n$]=0.11 dL/gm (25° C., m-cresol). TGA: 10% wt loss (air)=260° C. DSC: $T_g$=104° C. $^1$H NMR (CF$_3$COOD+TMS): Integration calculations for aromatic and acidic protons to aliphatic protons revealed that the polymer contained 57% Reissert units and 43% nylon-6,6 units.

The Table given below gives some of the characteristics which were determined for the structures realized from the foregoing synthesis procedures. In the Table the following letters denote the following respective structures:

A—Nylon 6,6: H[NH-(CH$_2$)$_6$—NH—CO—(CH$_2$)$_4$—CO]—OH

B—Triblock copolymer of Reissert (x) and nylon, 6,6 (y) repeating units:

$$-[N(CH_3)-CH(CN)ArCH(CN)N(CH_3)CO-(CH_2)_4-CO]_{\frac{x}{2}}-$$

$$-[NH(CH_2)_6-NH-CO-(CH_2)_4-CO]_{y}]_n-$$

$$-[N(CH_3)CH(CN)ArCH(CN)N(CH_3)CO-(CH_2)_4-CO]_{\frac{x}{2}}-$$

C—Open chain poly(Reissert compound):

$$H-[N(CH_3)CH(CN)ArCH(CN)N(CH_3)CO(CH_2)_4CO]_n-OH$$

D—Nylon 6,6-end capped with Reissert compound:

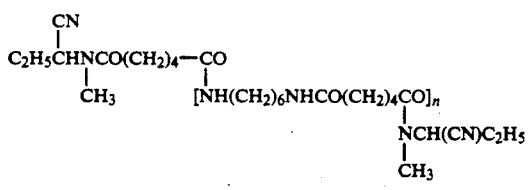

E—Random copolymer:

$$-[(N(CH_3)CH(CN)ArCH(CN)N(CH_3)CO(CH_2)_4CO)_x-$$

$$-[NH(CH_2)_6NHCO(CH_2)_4CO)_y]_n$$

In each of the above where Ar appears it is meant to depict a 4,4'-substituted phenyl ring.

Structure A is set forth as a control. Structure C depicts the type of open chain poly(Reissert compound) covered by U.S. Pat. No. 4,929,713 in which methyl substitution is on the nitrogen atom in the backbone. Structures B, D and E are intended to illustrate certain embodiments of the present invention.

TABLE

| Structure | Solubility | Viscosity (dL/g, in m-Cresol[a]) | Ratio (x:y) Targeted | $^1$H NMR[b] CF$_3$CO$_2$D | TGA (air) 10% wt Loss (°C.) | DSC (°C.) $T_g$ | DSC (°C.) $T_m$ |
|---|---|---|---|---|---|---|---|
| A | Cl$_2$CHCO$_2$H m-Cresol | 0.51 | 0:100 | 0:100 | 380 | 61 | 251 |
| B | Cl$_2$CHCO$_2$H m-Cresol DMSO | 0.50 | 36:64 | 32:68 37:63[c] | 370 | 70 | 251 |
| B | Cl$_2$CHCO$_2$H m-Cresol | 0.55 | 10:90 | 12:88 | 340 | 61 | 250 |
| C | DMF, DMSO, THF, m-Cresol | 0.15 (in THF) | 100:0 | 100:0[d] | 340 | 107 | — |
| D | m-Cresol | 0.57 | 2:98 | 3.5:96.5 | 320 | 59 | 248 |
| D | m-Cresol | 0.53 | 2:98 | 3.5:96.5 | 360 | 58.5 | 217, 249 |
| D | m-Cresol | 0.21 | 15:85 | 6:94 | 375 | 88 | 226, 235 |
| D | DMF m-Cresol | 0.13 | 1:1 | 22:78 | 370 | — | 147, 178 |
| E | DMF, MeOH m-Cresol | 0.16 | 34:66 | 43:57 | 260 | 99 | — |
| E | DMF, MeOH m-Cresol | 0.11 | 34:66 | 57:43 | 260 | 104 | — |

[a]The polymer (200 mg) dissolved to the extent of over 95% in hot m-cresol (20 ml). The solution was cooled to room temperature and viscosities were run at room temperature.
[b]The solid state $^{13}$C NMR spectrum clearly showed the incorporation of the Reissert group. However, copolymer ratio calculations were not accurate due to overtone bands overlapping as well as inherent inaccuracy of integration values.
[c]In DMSO - d$_6$.
[d]Decomposition of this polymer was noted in TFA with time.

We claim:

1. A modified polyamide composition which comprises: polyamide units of the formula —[NH—R$^2$—NH—CO—R$^1$—CO]- where R$^1$ and R$^2$ are alkylene; and at least one open chain Reissert unit of either the formula

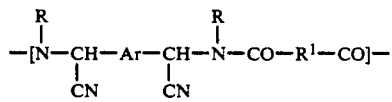

where Ar is phenylene, R is alkyl and R$^1$ is alkylene or the formula

where R$^3$ and R$^4$ are alkyl therein.

2. A composition as claimed in claim 1 wherein the polyamide unit is nylon 6,6.
3. A composition as claimed in claim 1 wherein R$^1$ is C$_4$ alkylene.
4. A composition as claimed in claim 1 wherein R$^1$ is C$_6$ alkylene.
5. A composition as claimed in claim 1 wherein R$^3$ is ethyl.
6. A composition as claimed in claim 1 wherein R$^4$ is methyl.

* * * * *